April 23, 1957   C. A. PETHYBRIDGE   2,789,440
TRANSMISSION
Original Filed Feb. 24, 1950   2 Sheets-Sheet 1
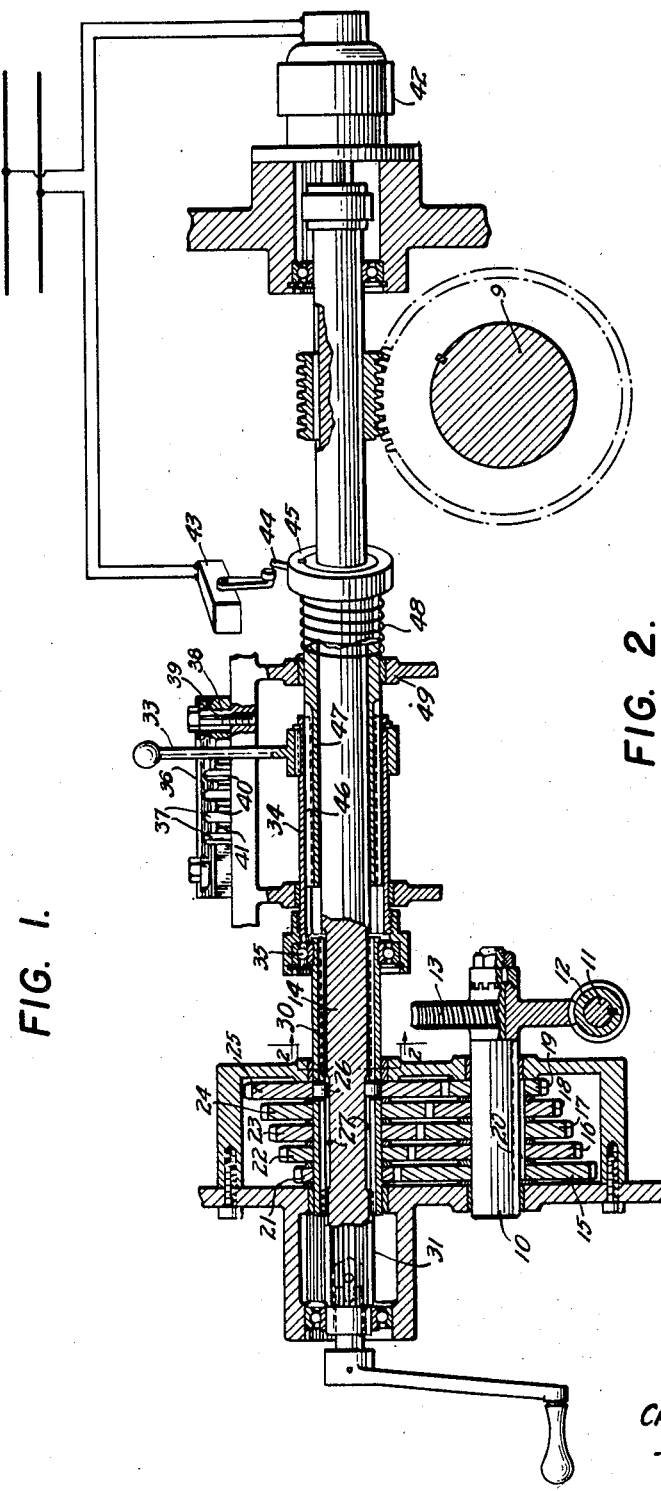
INVENTOR
CHARLES A. PETHYBRIDGE
BY
Mitchell & Bechert
ATTORNEYS

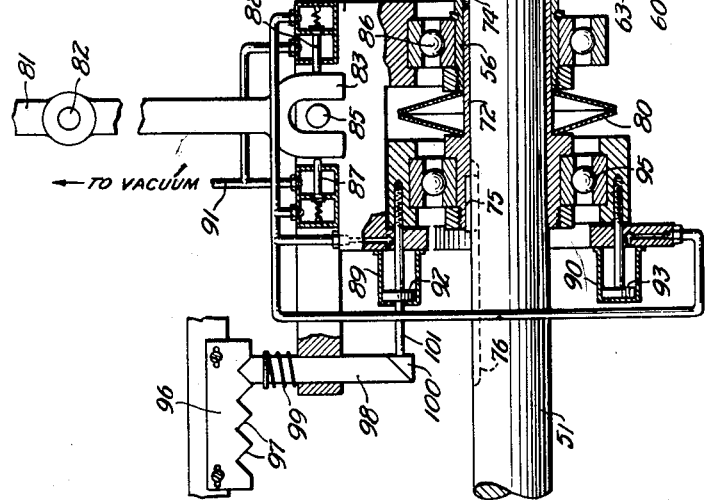

United States Patent Office 2,789,440
Patented Apr. 23, 1957

2,789,440

TRANSMISSION

Charles A. Pethybridge, New Britain, Conn., assignor to The New Britain Machine Company, New Britain, Conn., a corporation of Connecticut Original application February 24, 1950, Serial No. 145,999, now Patent No. 2,698,545, dated January 4, 1955. Divided and this application October 11, 1954, Serial No. 461,331

6 Claims. (Cl. 74—371)

My invention relates to a transmission mechanism wherein it is desired to provide readily selected speed ratios between a driving shaft and a driven shaft. This application is a division of my Patent 2,698,545.

It is an object of the invention to provide an improved mechanism of the character indicated.

It is another object to provide an improved transmission wherein gear-selection and gear-change may be effected during movement of the driving and driven parts.

It is also an object to provide improved automatic clutching means in a gear-shifting mechanism.

It is a further object to provide improved means for preventing improper gear selection in a transmission of the character indicated.

It is a specific object to provide an improved gear-shifting mechanism for application to a machine tool and characterized by rapid non-fouling selection of positive drive speeds.

It is another specific object to provide an improved automatically clutching transmission for automotive purposes, including a direct drive to the exclusion of gears.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a partially schematic longitudinal sectional view of a transmission incorporating features of the invention and having particular application to machine-tool or the like uses;

Fig. 2 is an enlarged fragmentary sectional view more or less in the plane 2—2 of Fig. 1;

Fig. 3 is a partially schematic longitudinal sectional view of an automotive-type transmission incorporating features of the invention; and Fig 4 is an enlarged fragmentary partly broken-away view of certain clutch elements in the mechanism of Fig. 3.

Briefly stated, my invention contemplates an improved automatically clutching transmission wherein overrunning-clutch means is longitudinally slidably mounted on a shaft, and wherein shifting means may appropriately position the clutching means for selectable engagement with one of a plurality of gears or other power-transmitting means carried on the shaft. While constant reference will be made herein to gears as the power-transmitting elements, it will be appreciated that the term "gear" is used in a larger sense, so as to include belt-and-pulley, chain-and-sprocket, and other well-known forms of power-transmission mechanism.

In the forms to be described, a plurality of gears is fixed against rotation relatively to one shaft and in constant meshing relation with gears freely rotatably carried on another shaft, and the overrunning-clutch means is slidably positionable along said other shaft for appropriate selection of the gear which will engage the two shafts. Shifting is possible upon a relative movement of the clutch elements in the overrunning direction, and the shifting means may be provided with an initial lost motion or displacement which may be utilized to momentarily free the clutch elements prior to a shifting operation. In one form to be described, I provide electrically operated means to free the clutch by having it overrun, and in the other form I employ fluid-pressure-actuated means. Further means may be associated with the shifting mechanism, and effective upon the initial displacement or lost motion, positively to locate the overrunning-clutch means for engagement with one and only one of the gears which may be selected.

Referring to Figs. 1 and 2 of the drawings, my invention is shown in application to a transmission which may be particularly useful in machine-tool applications, as for example in a machine of the character disclosed in the copending patent application of D. H. Montgomery et al., Serial No. 196,108, filed November 17, 1950, now Patent No. 2,680,281, dated June 8, 1954. The mechanism may include a drive shaft 10 which may be constantly driven at a relatively low speed, as by means of a jack shaft 11, via a worm 12 and worm wheel 13. Drive from the shaft 10 is to be imparted at selectable speed ratios to a driven shaft 14, and for this purpose a plurality of constantly meshing gears is carried on each of the shafts 10—14. In the case of one shaft (10), gears 15—16—17—18—19 may all be held against rotation relatively to said one shaft, as by key means 20. The corresponding gears 21—22—23—24—25 on the other shaft (14) may all be freely rotatably supported thereon. Power output may be relayed from the driven shaft 14 to a suitable jackshaft 9 by worm-and-worm-wheel means, as shown.

In accordance with the invention, I provide selectably longitudinally positionable overrunning-clutch means for selectively engaging the other shaft (14) to one of the freely rotatable gears 21—25, in order to establish the desired drive relation between shafts 10—14. In the form shown, the overrunning clutch means includes a rollable element 26, which for symmetry of clutching forces may be provided in angularly spaced plurality, at essentially one radial plane about the axis of the said other shaft (14). The bores of the gears 21 to 25 may be provided with appropriate wedging recesses for wedging engagement with clutch rolls 26, but I have shown the gear bores to be circular and the wedging engagement to be derived from a plurality of cam flats 27 on the said other shaft (14), the flats 27 extending for an axial length which will overlap all the gears 21 to 25.

It will be appreciated that by a proper proportioning of the gear-bore diameter, as at 28, with respect to the location of flats 27 and with respect to the size of rolls 26, a free-wheeling or overrunning-relation may be established between the shaft 14 and a gear 25 when the roll 26 is centrally positioned as at the phantomed location 29 in Fig. 2. Also, clutching engagement for one direction of relative rotation of shaft 14 to a gear (25) may be had when the roll 26 is displaced from the central position, as shown in Fig. 2.

As a means for shifting or for slidably displacing the rolls along the axis of shaft 14 for engagement alignment with one of the gears 21 to 25, I have provided a sleeve 30. The sleeve 30 may be locked against rotation relatively to the shaft 14, as by means of a splined engagement 31 between these parts, and the sleeve may provide bearing support for the hubs or bores of the various gears 21 to 25. For positive axial location of the clutch rolls 26 the sleeve 30 may be apertured at windows 32, all preferably aligned in substantially the same radial plane.

Longitudinal shifting displacement for appropriate selection of gear ratios may be effected automatically through a suitable cam program, as disclosed in the said copending patent application. However, in the form shown I have employed a manually shiftable arrangement. The manual-shifting means may include a handle or nobbed shank 33 which may be keyed to a sleeve member 34. The sleeve member 34 and the shift sleeve 30 may be held by thrust-bearing means 35 against relative axial movement and free for relative rotation. It will be clear then that, upon a longitudinal displacement of the hand control 33, the sleeve 30 and therefore the rolls of the clutch may be displaced as desired for engaging alignment with one of the gears 21 to 25.

In order to assure that a given longitudinal shift of the control handle 33 may always accurately locate the clutch means 26 for engagement with one and only one of the gears 21 to 25, I provide suitable abutment means which may be fixed relatively to the various longitudinally displaceable elements. In the form shown, such abutment means is a fixed comb or serrated member 36 having locating recesses 37 appropriately spaced in accordance with spacing of the gears 21 to 25. For initial alignment purposes, slots 38 associated with the fixed mounting means 39 may permit accurate positioning of the rolls 26 with respect to the various gears 21 to 25, as will be clear. The projections 38 between successive recesses 40 may be pointed, as at 41, to assure that, when the handle 33 is moved transversely for engagement with one of the recesses 37, the projecting slopes of the teeth 40 will cam the handle 33 into one of the locating recesses 37.

For an automatic clutching of my transmission, I provide means, effective upon an initial displacement of the shift member 33 and prior to any substantial longitudinal displacement thereof, to establish a disengaged or overrunning condition of the clutch means 26. In the form shown in Fig. 1, I employ electric means for this purpose, and the electric means includes an auxiliary motor 42 which is to be effectively coupled to the driven shaft 14 to drive the driven shaft at such speed as will make the clutch 26 overrun, whatever the existing geared relationship between shafts 10—14. The motor 42 may be engaged to the driven shaft 14 upon operation of an electric switch 43, and the electric switch 43 may be operated in the course of the initial partial rotational or transverse displacement of the shift handle 33, that is, while the shift handle 33 is still longitudinally located by the side walls of the rotating recess 37.

The means for operating the switch in the indicated manner may include an arm or pin 44 carried by a hub 45 which is not to be longitudinally displaced but which is to be partially rotated upon partial rotation of the shift handle 33. Thus, the engagement between the shift handle 33 and the hub 45 may be made by means of splines 46 between the shift sleeve 34 and a switching sleeve 47 to which the hub 45 is keyed. Means are preferably provided normally to urge the shift handle 33 for engagement with one of the recesses 37; with a suitable disposition of the described elements, this result may be effected by the action of gravity on the shift handle 33, but in the form shown, I employ torsion-spring means 48, acting between a part of the frame 49 and the hub 45 and resiliently urging the handle 33 into one of its locating positions. It will be understood that the electrically operated means 42 may be disengaged from the driven shaft 14 when the handle 33 is bottomed in one of the recesses 37, thus allowing resumption of a driven geared relationship between shafts 10—14.

For the form shown, wherein the high-speed motor drive sets up an overrunning condition in the clutch, the angular width and disposition of the clutch-element windows 32 with respect to the flats 27 is preferably such that clutch-engagement is possible for only one sense of relative rotation of the gears 21 to 25 and shaft 14.

In operation, the mechanism of Figs. 1 and 2 may function as follows: Say that the constant slow-speed drive available from the shaft 11 is being applied to the driven shaft 14 by way of the lowest speed ratio, as determined by the gears 19—25 shown, and assume that it is desired to shift to a gear ratio which will increase the speed of rotation of the shaft 14. The handle 33 is first grasped and transversely moved out of the slow speed recess 37, and in the course of this transverse movement switch 43 is effective to apply a high-speed drive to the driven shaft 14 and, therefore, to disengage or to overrun the clutch means 26. The clutch means 26 is then free of all the gears 21 to 25, and the handle 33 is free of the serrations or locating abutments 36, so that the handle 33 may now be moved longitudinally in general alignment with another recess 37.

Upon selection of the approximate position for a locating recess 37, the handle 33 may be allowed to seek the recess under the influence of spring 48, and the sloping walls of a projection 40 may assure proper location of the handle 33 regardless of any slight error in manual placement. Upon descent of the handle 33 into the proper locating recess 37, the electric means 42—43 will be effectively disengaged from the driven shaft 14 so that the overrunning-clutch means 26 may now institute a drive via the selected gear train.

In Figs. 3 and 4, I show an application of my invention to an automotive-type transmission wherein a propeller shaft 50 is to be driven by a drive shaft 51 which may be directly coupled to an automobile engine. In the arrangement shown, provision is made for at least one of the selected speeds to be a direct drive from the shaft 51 to the shaft 50, but for other (reduced) speed relationships an auxiliary shaft 52 may be employed. The relationship between the shafts 51—52 may in many respects resemble the relation between the shafts 10—14 of Fig. 1; but in the arrangement of Figs. 3 and 4, I have disposed the overrunning-clutch means on the drive shaft 51. Thus, on the drive shaft 51, a plurality of gears 53—54—55 may be freely rotatably mounted upon a sleeve 56 to be employed for clutch-shifting purposes.

As in the other described form, the sleeve 56 may include a plurality of locating pockets or windows 57 for axially positioning a plurality of overrunning-clutch elements 58. The clutch elements 58 may be positioned for engagement with one or more of the gears 53—54—55 and with the bore in a sleeve member 59 for direct-drive purposes, as will later be clear. A plurality of gears 60—61—62 may be held against rotation relatively to the auxiliary shaft 52 and in meshing relation with the gears 53—54—55 on the drive shaft 51; in the form shown, the gear train 53—60 is employed for reverse-drive puposes, and these gears mesh through an idler gear 63. The various speed relations determined by clutching the drive shaft 51 to one of the gears 53—54—55 may be translated to the auxiliary shaft 52, and, in turn, such speed relations may be transferred to the main propeller shaft 50 by a 1:1 key gear train 64—65.

For direct-drive purposes, the shafts 50—51 may axially overlap, and in the form shown the sleeve member 59 provides the overlapping function. The sleeve 59 is preferably bored to the bore dimensions of the gears 53—54—55, so as to be engageable by the overrunning-clutch means 58, as shown in Fig. 3. The sleeve 59 may be keyed, as at 66, to the propeller shaft. For proper support of the entire assembly, there may be main bearings 67—68 for the shafts 50—51, respectively, and a pin-roller bearing 69 for locating a projecting end 70 (of reduced diameter) of the shaft 51 within a bore in the end of the propeller shaft 50.

In theory, and with a proper design of the window openings 57 for the overrunning-clutch means 58, the described transmission could be usefully employed without further mechanism as long as there are means for longitudinally shifting the clutch-placement sleeve 56.

The necessary declutching or overrunning function would occur upon a let-up of the accelerator, and the action of the driven shaft 50 to propel the mechanism would produce enough relative rotation in the overrunning or disengaging direction to permit a shifting operation. I prefer, however, that there shall be no substantial freewheeling effect in my transmission and that, as shown in Fig. 4, the windows 57 shall be symmetrically placed with respect to the center of the clutch flats 71, thus making possible clutch engagement for either direction of relative rotation of the shaft 50—51, so that compressional braking by the engine may be available. Under such preferred circumstances, it is necessary to hold the clutch elements 58 in a central or non-engaging position whenever the clutching is to be ineffective, and I have provided a novel mechanism for this purpose.

As a means for holding the clutch elements 58 in a central or declutched position, I employ further sleeve means 72 which may be concentric with the drive shaft 51 and with the sleeve 56. The sleeve 72 may be locked as by pin means 73 against rotation relatively to the sleeve 56, and a longitudinal slot 74 in sleeve 72 may permit certain relative longitudinal displacement of the two sleeves 72—56, as when effecting a declutching or a clutching operation. Both sleeves 72—56 may be held against rotation relatively to the shaft 51, as by key means 75 riding in an elongated key slot 76, which may permit the necessary shifting displacement in order to select any one of the four speed ratios shown.

As indicated, the sleeve 72 may serve the function, upon a longitudinal displacement relatively to the sleeve 56, of centrally holding the clutching means 58, so as to avoid clutch-engagement during shifting. In the form shown, the actuating end of the sleeve 72 is provided with a diverging locating opening or recess 77 for each clutch element 58 to be engaged. When the sleeves 56—72 are in a relative longitudinal position determining a clutching engagement, the openings or recesses 72 are retracted relatively to the windows 57 so that the wide-open mouths of these openings 77 may not inhibit clutch engagement. When, however, it is desired to shift gears, means are provided for relatively displacing the two sleeves 56—72 so that converging cam walls 78 of the openings 77 may draw the clutching elements 58 to a central position within the windows 57; openings 77 may hold clutch elements centrally (declutched) as long as the sleeves 56—72 are actuated to project the recesses 77 in general axial alignment with the windows 57. Upon retraction of the sleeves 56—72 relatively to each other, the clutch elements 58 may again be free to assume a clutched engagement as determined by the drive from the engine or by compressional braking.

I prefer that the clutching mechanism shall be normally biased for a clutching engagement, and I therefore provide means normally urging the sleeves 56—72 in a direction to permit such engagement. In the form shown, a pair of oppositely dished resilient frusto-conical washers or springs 80 serves to urge the sleeves 56—72 in the desired direction.

As in the case of the first-described embodiment, I prefer to employ, in conjunction with the gear-shifting mechanism, means responsive to an initial displacement thereof to assist a declutching operation so that shifting may proceed with utmost ease. Upon completion of the shifting (i. e. longitudinal placement of sleeve 56, and, therefore, of clutch means 58), the declutching means may be disabled, and the spring 80 may return the clutch to an engaged relation.

Various speed-responsive and vacuum-responsive means may be employed in an automatic shifting of the gears, but in the form shown in Fig. 3, manually operated means are employed. Such manual means may include a handle or arm 81 fixedly pivoted, as at 82, so as to throw a shift fork 83 generally longitudinally with respect to the shift axis. Shifting movements may be imparted to a yoke 84 via a pin 85 so as to impart longitudinal displacement to the sleeve 56. I prefer that the displacement thrust shall be effective through antifriction-bearing means, as via the thrust bearing 86.

It will be noted that, although shown schematically and therefore with some exaggeration, clearance is allowed between the fork 83 and the pin 85. Such clearance will be understood to provide a certain small lost motion between the shift arm 81 and the yoke 84, regardless of the direction in which the shift arm 81 is moved. In the form shown, I employ this lost motion to operate fluid-pressure means for compressing the spring 80 and, therefore, for effecting declutching of the elements 58 regardless of the driving relation between the shafts 50—51. For this purpose, twin opposed pilot-valve members 87—88 may bear against the shift fork 83 and may be resiliently urged toward a closed position. Both pilot valves may be manifolded to each other and to one or more actuating cylinders 89—90 for compressing the spring means 80. For convenience on a motor vehicle, the fluid-pressure means may be vacuum-operated, as by connection at 91 to the engine vacuum; the actuator pistons 92—93 will then in effect be sucked to compress the spring 80 each time the shift arm 81 is actuated, regardless of the direction of movement of the shift arm 81. Compressional thrust may be imparted by the pistons 92—93 to the spring 80 via antifriction thrust-bearing means 95, as will be clear.

In order to assure that clutching may not be permitted unless the clutching means 58 is longitudinally aligned with one of the gears 53—54—55 or with the sleeve 59, suitable locating-abutment means may be provided more or less along the lines discussed in connection with the arrangements of Figs. 1 and 2. In Fig. 3, however, I employ an abutment plate 96 adjustably fixed to the frame and having locating serrated abutments or recesses 97 in accordance with the spacing between gears 53—54—55. A locating pin 98 may be transversely slidably held in a part of the yoke 84 and resiliently urged, as by the spring 99, into engagement with one or the other of the serrations 97. The other end of the pin 98 may include a cam-like engagement with a slide block 100 which may be carried by the piston rod 101 of one of the cylinders 89. It will be clear that, unless the yoke 84 has properly positioned the clutching means 58 for alignment with one and only one of the gears 53—54—55 or sleeve 59, the pin 98 will not seat itself fully in one of the serrated locating recesses 97. Unless the pin 98 is thus fully seated, the slide block 100 will keep the spring 80 from returning the clutch to a position for clutch-engagement. If desired, the spring 99 may be made of sufficient strength to cause a cammed automatic location of correct clutch position opposite sleeve 59 or one of the gears 53—54—55, and of course when such location has been achieved, the described relation between pin 98 and slide block 100 will permit clutch engagement.

In operation, automatic shifting without loss of compressional braking may be achieved merely by operation of the single manual control 81. Initial displacement of the control 81 in either direction will effect declutching, so that the desired direct-drive or geared relationship may be selected with ease. Upon release of the control 81 in the selected position, clutching may be automatically reinstated. It will be clear that suitable detent or spring means (e. g. compression springs behind valve members 87—88) may be employed in conjuction with the control arm 81 to hold the same in a given selected position so that declutching will not be prematurely effected by way of the pilot valves 87—88.

It will be appreciated that I have described relatively simple transmission means incorporating automatic clutching means. In my arrangements, means are provided for automatically declutching so as to permit smooth and effortless shifting and for automatically reclutching once the desired shift has been made. My mechanism is essentially simple and by means of the described interlocking mechanism there is no chance of scraping gears or of incorrectly engaging any one of the possible geared relations.

While I have described my invention in detail for the preferred forms shown, it will be understood that modifications may be made within the scope of the invention as defined in the appended claims.

I claim:

1. In a transmission of the character indicated, two shafts to be selectably coupled to one another, a first plurality of gears on one of said shafts and held against rotation relatively to said one shaft, overrunning-clutch means on the other of said shafts and including a rollable element, two relatively longitudinally movable concentric sleeves on said other shaft and locked against rotation relatively to each other, a second plurality of gears carried by said sleeves and freely rotatable thereon and in constant meshing relation with the gears of said first plurality, one of said sleeves including means positively axially locating said rollable element, the other of said sleeves including cam means effective upon relative longitudinal displacement of said sleeves to cam said rollable element out of engaged relation with one of the gears of said second plurality, means for longitudinally displacing said sleeves relatively to each other, and means for longitudinally displacing said sleeves relatively to said gears.

2. A transmission according to claim 1, in which a single unitary shifting mechanism includes means effective to displace said sleeves relatively to each other prior to displacing said sleeves relatively to said gears, whereby in any given shifting operation said clutch means may be disengaged prior to shifting and reengaged upon accomplishment of a shift.

3. A transmission according to claim 1, in which resilient means cooperating between said sleeves urges said sleeves normally into a relative position wherein said cam means is out of engagement with said rollable element.

4. A transmission according to claim 3, in which said shift means includes means to move said sleeves relatively to each other and against the action of said resilient means.

5. In a transmission of the character indicated, two shafts to be selectably engaged to each other, meshing gears of various ratios on said shafts, bearing means for said shafts an both longitudinal sides of said gears, one of said shafts including a sleeve longitudinally slidably supported in said bearing means on both sides of said gears, the gears on said one shaft being carried by said sleeve and freely rotatable relatively to said one shaft, overrunning-clutch means retained by said sleeve and longitudinally displaceable with said sleeve for selectively engaging said one shaft to one of the gears on said sleeve, and sleeve-shifting means for longitudinally positioning said overrunning-clutch means and including fluid-pressure operated means operative upon an initial displacement of said shifting means and prior to a substantial longitudinal displacement of said shifting means to free said clutch means for engagement with one of said gears.

6. In a transmission of the character indicated, a drive shaft and a driven shaft on a common axis and including axially overlapping portions, an auxiliary shaft spaced from said common axis, gear means coupling said drive shaft to said auxiliary shaft and said auxiliary shaft to said driven shaft, said gear means including meshing gears of various ratios on said auxiliary shaft and on one of said drive and driven shafts, said one shaft including a sleeve longitudinally slidably supported within the meshing gears on said one shaft and said meshing gears on said one shaft being freely rotatable relatively to said one shaft, said sleeve extending within the region of overlap of said driving and driven shafts, overrunning-clutch means retained by said sleeve and longitudinally displaceable with said sleeve for selectively engaging said one shaft to one of the meshing gears on said sleeve or to the overlapping portion of the other of said driving and driven shafts, and sleeve-shifting means for selectively longitudinally positioning said overrunning-clutch means, whereby there may be direct-drive or various geared-drive relationships between said driving and driven shafts depending on the longitudinal placement of said overrunning-clutch means.

References Cited in the file of this patent
UNITED STATES PATENTS 2,110,180    Semery _____ Mar. 8, 1938
2,181,541    Barkeij _____ Nov. 28, 1939